US011974225B2

(12) United States Patent
Sharma et al.

(10) Patent No.: US 11,974,225 B2
(45) Date of Patent: *Apr. 30, 2024

(54) TELECOMMUNICATIONS APPARATUS AND METHODS IMPLEMENTING WAKE-UP SIGNALING WITH VALIDITY PERIOD

(71) Applicant: Sony Group Corporation, Tokyo (JP)

(72) Inventors: Vivek Sharma, Basingstoke (GB); Shin Horng Wong, Basingstoke (GB); Martin Warwick Beale, Basingstoke (GB); Samuel Asangbeng Atungsiri, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,482

(22) Filed: Jun. 14, 2022

(65) Prior Publication Data

US 2022/0312323 A1    Sep. 29, 2022

Related U.S. Application Data

(63) Continuation of application No. 16/760,044, filed as application No. PCT/EP2018/080667 on Nov. 8, 2018, now Pat. No. 11,382,037.

(30) Foreign Application Priority Data

Nov. 15, 2017   (EP) ..................................... 17201966

(51) Int. Cl.
*H04W 52/02*  (2009.01)
*H04W 8/08*   (2009.01)
(Continued)

(52) U.S. Cl.
CPC ......... *H04W 52/0229* (2013.01); *H04W 8/08* (2013.01); *H04W 36/08* (2013.01);
(Continued)

(58) Field of Classification Search
CPC . H04W 52/0229; H04W 76/28; H04W 76/27; H04W 8/08; H04W 36/08; H04W 68/005
(Continued)

(56) References Cited

U.S. PATENT DOCUMENTS 11,012,975 B2    5/2021  Sharma et al.
2007/0234401 A1* 10/2007 Eldar ..................... H04L 12/12
726/2
(Continued)

OTHER PUBLICATIONS

International Search Report and Written Opinion dated Feb. 4, 2019 for PCT/EP2018/080667 filed on Nov. 8, 2018, 10 pages.
(Continued)

*Primary Examiner* — Michael Y Mapa
(74) *Attorney, Agent, or Firm* — XSENSUS LLP

(57)   ABSTRACT

A method of operating a terminal device in a wireless telecommunications system comprising the terminal device and a plurality of network access nodes, wherein the method comprises: establishing first wake-up signalling configuration information for a first network access node covering a current location for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format; monitoring for signalling transmitted by one of the plurality of network access nodes in accordance with the first wake-up signalling
(Continued)

format during the first wake-up signalling validity period, and seeking to decode a subsequent paging message if wake-up signalling in accordance with the first wake-up signalling format is detected; establishing second wake-up signalling configuration information for a second network access node covering a current location for the terminal device in response to determining the first wake-up signalling validity period has expired, wherein the second wake-up signalling configuration information comprises an indication of a second wake-up signalling format to be transmitted by the second network access node in advance of transmitting a paging message to indicate the terminal device should seek to decode the paging message, and an indication of an associated second wake-up signalling validity period for the second wake-up signalling format; and monitoring for signalling transmitted by one of the plurality of network access nodes in accordance with the second wake-up signalling format during the second wake-up signalling validity period, and seeking to decode a subsequent paging message if wake-up signalling in accordance with the second wake-up signalling format is detected.

17 Claims, 6 Drawing Sheets

(51) Int. Cl.
*H04W 36/08* (2009.01)
*H04W 68/00* (2009.01)
*H04W 76/27* (2018.01)
*H04W 76/28* (2018.01)

(52) U.S. Cl.
CPC ......... *H04W 68/005* (2013.01); *H04W 76/27* (2018.02); *H04W 76/28* (2018.02)

(58) Field of Classification Search
USPC .... 455/426.1, 432.1–452.2, 456.1–458, 515; 370/252, 329, 331
See application file for complete search history.

(56) References Cited

U.S. PATENT DOCUMENTS

2019/0103950 A1* 4/2019 Liu ................... H04W 52/0216
2020/0029302 A1* 1/2020 Cox .................. H04W 52/0216
2021/0377854 A1* 12/2021 Hwang ............. H04W 52/0216

OTHER PUBLICATIONS

Hambeck, C., et al., "A 2.4μW Wake-up Receiver for Wireless Sensor Nodes with—71dBm Sensitivity," IEEE Proceeding International Symposium of Circuits and Systems (ISCAS), 2011, pp. 534-537.
3GPP, "LTE;Evolved Universal Terrestrial Radio Acess Network (E-UTRAN); S1 Application Protocol (S1AP), " TS 36.413 version 13.5.0 Release 13, Jan. 2017, pp. 1-499.
Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.
Huawei at el., "New WID on Further NB-IoT enhancements", 3GPP TSG RAN Meeting #75, RP-170852, Dubrovnik, Croatia, Mar. 6-9, 2017, 6 pages.
3GPP, "LTE; Evolved Universal Terrestrial Radio Access (E-UTRA); User Equipment (UE) procedures in idle mode," TS 36.304, version 14.2.0, Release 14, Apr. 2017, pp. 1-51.
3GPP, "LTE; Evolved Universal Terrestrial Radio Access (E-UTRA); Radio Resource Control (RRC); Protocol specification," TS 36.331, version 13.5.0, Release 13, Apr. 2017, pp. 1-636.
Ericsson, "Revised WID for Further Enhanced MTC for LTE," 3GPP TSG RAN Meeting #73, RP-161464, revision of RP-161321, New Orleans, USA, Sep. 19-22, 2016, 6 pages.
Huawei and Hisilicon, "Revised work item proposal: Enhancements of Nb-Iot", 3GPP TSG RAN Meeting #73, RP-161901, revision of RP-161324, New Orleans, USA, Sep. 19-22, 2016, 8 pages.
3GPP, "LTE;General Packet Radio Service (GPRS) enhancements for Evolved Universal Terrestrial Radio Access Network (E-UTRAN) access," TS 23.401 version 14.5.0 Release 14, Oct. 2017, pp. 1-398.
MCC Support, "Draft Report of 3GPP TSG RAN WG1 #90bis v0.1.0," vol. RAN WG1, No. Nov. 27, 2017-Dec. 1, 2017, Reno, USA, Oct. 19, 2017, pp. 1-174.
Holma, H. and Toskala, A, "LTE for UMTS OFDMA and SC-FDMA based radio access", John Wiley and Sons, 2009, 8 pages.

* cited by examiner

TELECOMMUNICATIONS APPARATUS AND METHODS IMPLEMENTING WAKE-UP SIGNALING WITH VALIDITY PERIOD

CROSS-REFERENCE TO RELATED APPLICATIONS

The present application is a continuation of U.S. application Ser. No. 16/760,044, filed Apr. 29, 2020, which is based on PCT filing PCT/EP2018/080667, filed Nov. 8, 2018, which claims priority to EP 17201966.3, filed Nov. 15, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support a wide range of devices associated with different operating characteristics, for example in terms of frequency of communications and requirements for low power usage.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. Low power consumption may be a particularly important consideration for these types of device, for example because they are small devices having correspondingly small batteries or because they remotely located without ready access to external power. While a desire for low power consumption may be a particularly important consideration for such devices compared to other devices, it will nonetheless be appreciated that approaches that help reduce power consumption can be useful for all types of terminal device.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
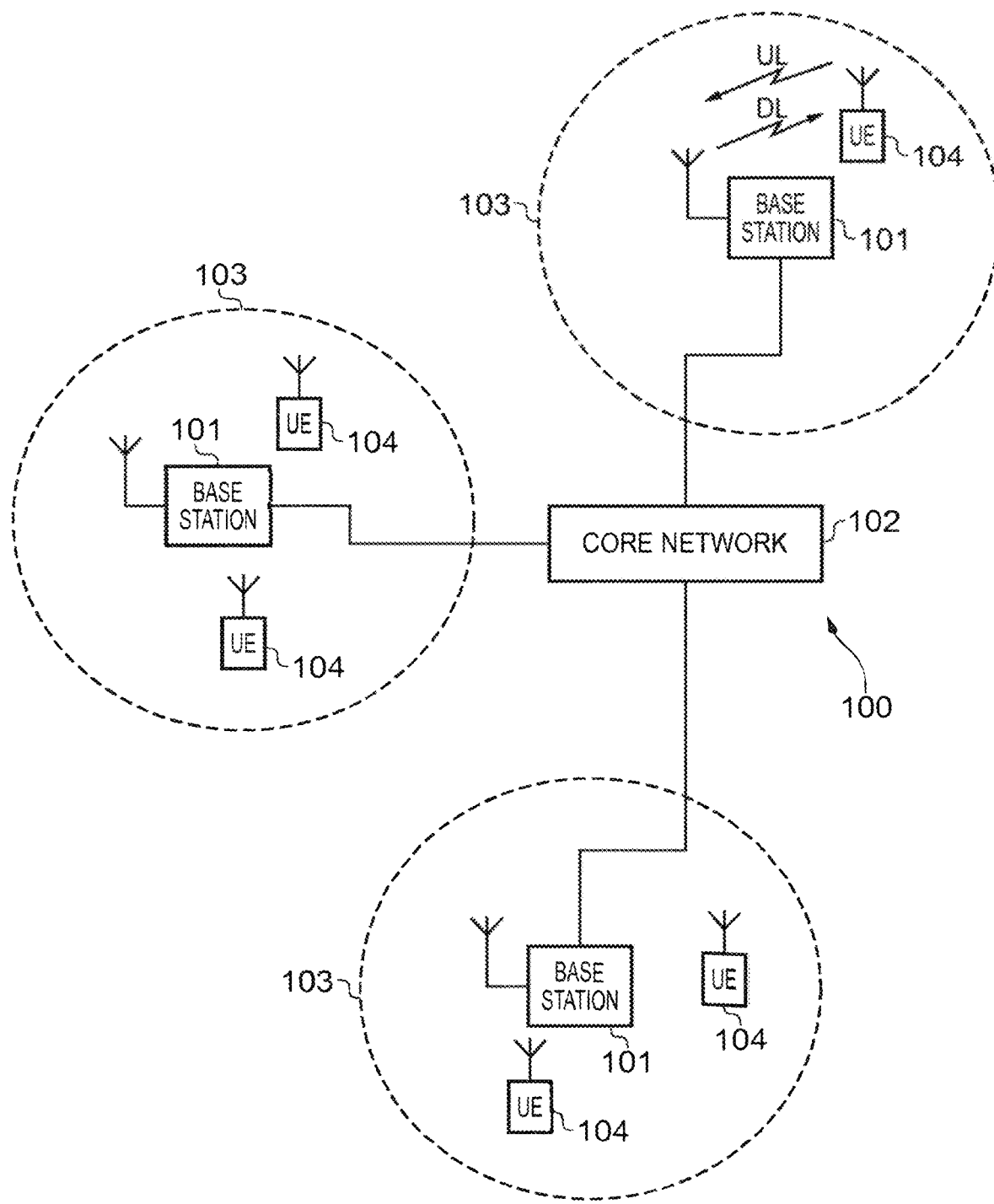
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
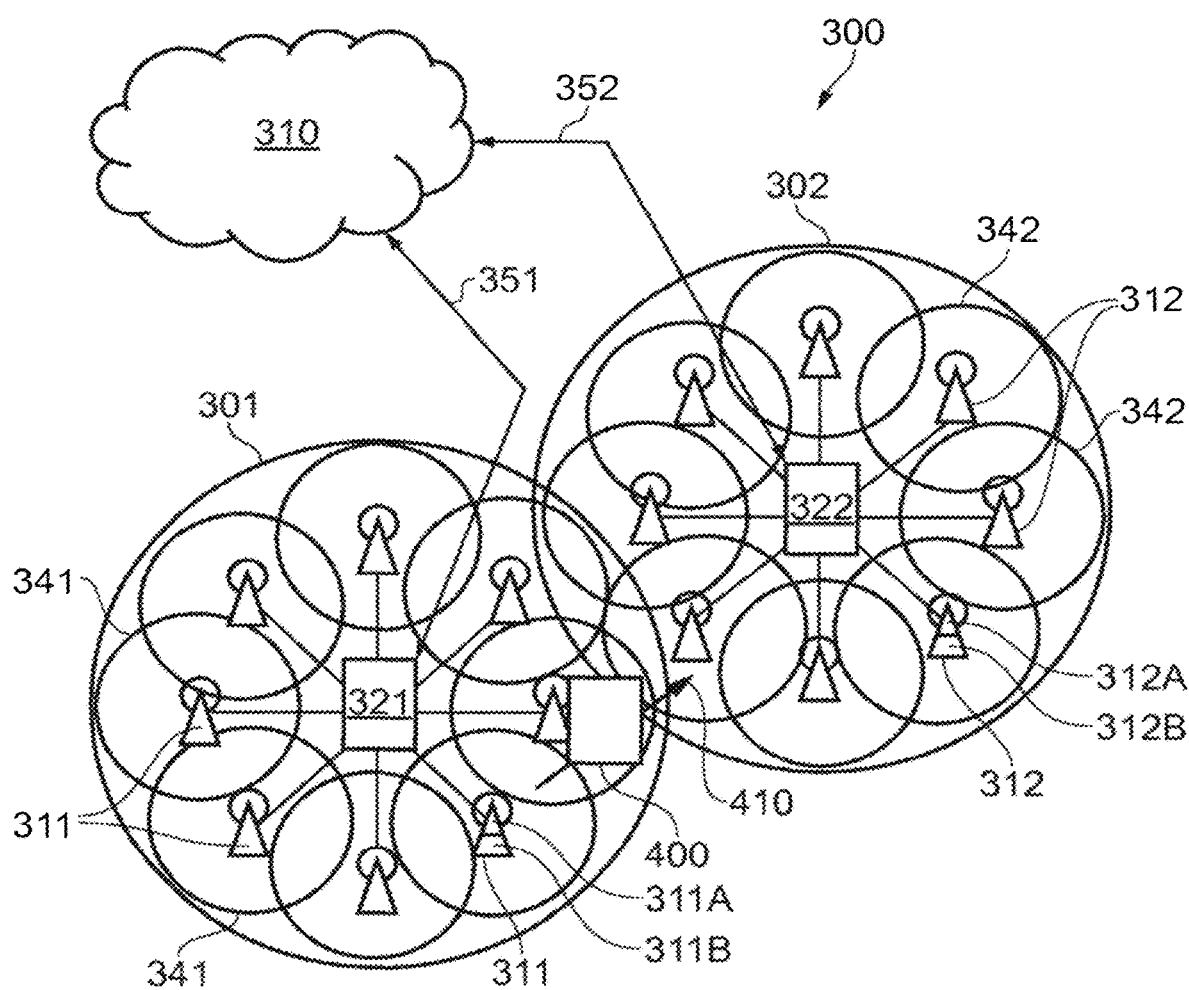
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311a, 311b configured to control the respective distributed units 311, 312.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station. In addition to these idle and connected modes there are also proposals for other RRC modes, such as the so-called RRC_INACTIVE mode. A terminal device in RRC_INACTIVE mode is one which is not in an active RRC connected mode with the radio access network (RAN), but is considered to be RRC Connected from a CN (core network) point of view, so that data can be sent without CN-level paging, but with paging performed instead at the RAN level, to cause/trigger the terminal device to resume RRC connection (enter an RRC connected mode). This approach has the benefit of being able to allow a terminal device to enter a more power efficient state, while reducing the signalling between the CN and the RAN. The overall procedure allows RAN to take over responsibility for paging the terminal device, effectively hiding the RRC state transitions and mobility from the CN, and the CN therefore may directly send data as if the terminal device was still connected and in the same cell.

For a terminal device in RRC idle mode the core network is aware that the terminal device is present within the network, but the RAN part (comprising radio network infrastructure equipment such as the base stations 101 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently when a core network is required to connect to an idle mode terminal device a paging procedure is used.

In a typical currently deployed network, terminal devices which are not connected to the network (i.e. not in RRC_CONNECTED mode) monitor for paging messages periodically. For terminal devices operating in a discontinuous reception (DRX) mode this occurs when they wake-up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

In a conventional system, a terminal device thus receives and checks the contents of specific sub-frames (paging occasions) in specific frames (paging frames) to look for paging signalling. For example, in accordance with the procedures set out in 3GPP TS 36.304 version 14.2.0

Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent depending channel on implementation, e.g. MPDCCH or for NB-IOT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by 3GPP TS 36.321 version 13.5.0 Release 13 [7]). All terminal devices check whether PDCCH at specific PFs/POs configured for their use include P-RNTI or not. If there is a PDSCH allocation addressed to P-RNTI in the relevant subframe, the terminal device proceeds to seek to receive and decode the paging messages transmitted on the allocated resources on PDSCH. The terminal device then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of terminal device, for example MTC devices, it may be expected the corresponding channel names may be modified. For example, a physical downlink control channel dedicated for MTC devices may be referred to as MPDCCH and a corresponding physical downlink shared channel for MTC devices may be referred to as MPDSCH.

In proposed approaches for eNB-IoT and feMTC in accordance with 3GPP release 14 a terminal device in DRX in idle mode decodes PDCCH (or equivalent downlink control channel for the specific implementation at hand) to identify if there are resources scheduled on PDSCH (or equivalent downlink shared channel for the specific implementation at hand) for a paging message during paging occasions in which the terminal device might receive a paging message.

Figure 3:
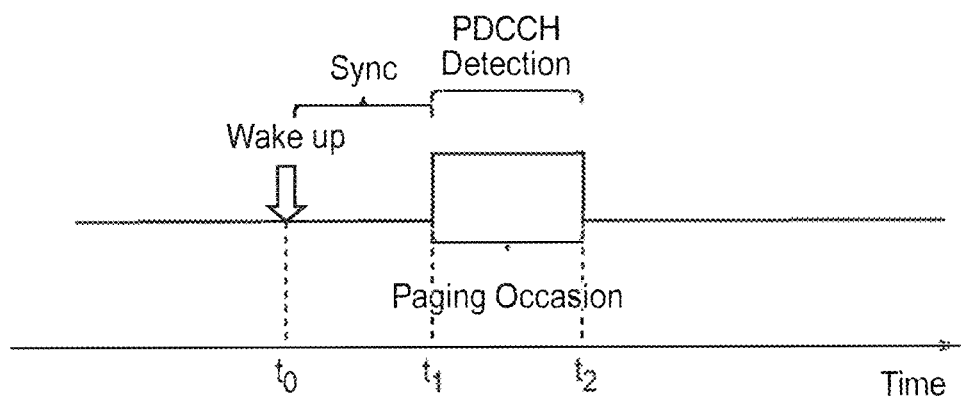
FIGS. 3 and 4 schematically represent example time lines associated with paging occasions in wireless telecommunication systems.

FIG. 3 schematically represents a timeline of a paging occasion for a terminal device operating in a wireless telecommunications system. In the example shown in FIG. 3, one paging occasion is shown and extends from time t1 to t2. Paging occasions for a terminal device will typically occur according to a regular repeating schedule having regard to the terminal device's currently configured DRX cycle. Different terminal devices may have different DRX cycle lengths, and so have different times between paging occasions. For a terminal device having a relatively long DRX cycle/time between paging occasions, it is possible the terminal device will to some extent lose synchronisation with the radio network infrastructure equipment of the telecommunications system between paging occasions. Thus it may be helpful for a terminal devices to wake-up in advance of a paging occasion to allow it to synchronise to the wireless telecommunications system prior to the paging occasion. An example of this is schematically shown in FIG. 3 in which the terminal device wakes up at time t0 so that it can synchronise with the wireless telecommunication system in the period between times t0 and t1 so that it is able to monitor/detect PDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the terminal device may become significantly offset relative to that of the radio network infrastructure).

Once the terminal device has re-synchronised to the network, it will monitor PDCCH to determine if there is a paging message, and if so will go on to decode the PDSCH carrying the paging message in the usual way. If there is no paging message for the terminal device, the terminal device will go back to sleep (low power mode) until the next paging occasion. For certain types of terminal device, such as MTC devices, it may be expected paging will occur relatively rarely (e.g. once per day for a smart utility meter), and so in many cases the terminal device may wake-up and synchronise to the network to monitor PDCCH by blind decoding for a paging message when in fact there is no paging message for the terminal device. This represents an undesirable "waste" of resources, for example battery power, for the terminal device.

Proposed approaches for eNB-IoT and feMTC in accordance with 3GPP release 15 share several common objectives, and one of these objectives is to reduce power consumption associated with monitoring for paging massages. One proposal for this is to introduce what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [8]). The proposed WUS is carried on a new physical channel and is intended to allow terminal devices to determine whether or not they need to actually decode PDCCH in an upcoming paging occasion. That is to say, whereas in accordance with previously proposed techniques a terminal device decodes PDCCH during every paging occasion to determine if there is a paging message, and if so decodes PDSCH to determine if the paging message is addressed to the terminal device, the WUS is instead intended to indicate to the terminal device whether or not the next paging occasion contains a paging message that the terminal device should decode. A WUS is transmitted at a pre-determined/derivable time in advance of a scheduled paging occasion such that a terminal device knows when to seek to receive a WUS and may contain relatively little information so that it can be decoded quickly (as compared to the blind decoding needed for PDCCH). For example, in some implementations the WUS may include a one-bit indication of whether or not there will be a paging message transmitted in the upcoming paging occasion. In some implementations the indication provided by the WUS may be based on whether or not the WUS signalling is present.

If the WUS indicates the upcoming paging occasion does include a paging message, any terminal devices for which that paging occasion applies may proceed to decode the paging message as normal to determine if the paging message is addressed to it. If the WUS indicates the upcoming paging occasion does not include any paging message, any terminal device for which that paging occasion applies can determine from this that it does not need to monitor for a paging message during the upcoming paging occasion, and so can, for example, return to a low power mode. In some implementations the \NUS may include an identifier for a terminal device that is going to be paged in the paging occasion. This identifier may identify an individual terminal device or may identify a group of terminal devices. The WUS may include multiple identifiers for multiple terminal devices/groups. A terminal device which determines the WUS is associated with an identifier that applies to it may proceed to decode the paging message as normal. Conversely, a terminal device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 4:
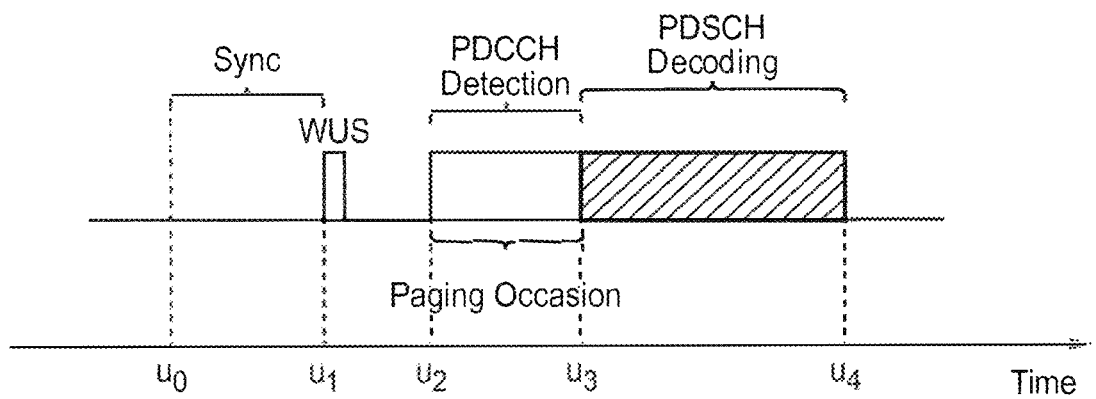

FIG. 4 schematically represents a timeline for a paging occasion for a terminal device operating in a wireless telecommunications system employing a WUS as proposed in association with 3GPP Release 15. In the example shown in FIG. 4, a paging occasion extends from time u2 to u3. As is conventional, the paging occasions will typically occur according to a regular repeating schedule having regard to the terminal device's currently configured DRX cycle.

As schematically indicated in FIG. 4, a WUS is transmitted at a predetermined/derivable time u1 in advance of the paging occasion to indicate there is a PDCCH paging message transmission for a terminal device indicated by an identifier associated with the WUS, which may identify an individual terminal device or a group of terminal devices. If the paging occasion is not scheduled to include a PDCCH paging message transmission for a terminal device, then a WUS identifying that terminal device is not sent. Thus a terminal device may be configured to seek to detect a WUS associated with an identifier for the terminal device in advance of an upcoming paging occasion. If the terminal device detects a WUS associated with an identifier for itself, the terminal device can proceed to fine tune its frequency and timing tracking loops if required and blind detects for a PDCCH between times u2 and u3, followed by decoding of the PDSCH carrying the paging message between time u3 and u4 in the usual way. If, however, the terminal device fails to detect a WUS associated with an identifier for the terminal device, the terminal device may assume there is not going to be a paging message for the terminal device in the upcoming paging occasion, and so may go back to sleep (low power mode) and not decode PDCCH in the paging occasion. As noted above, in some other implementations, the WUS might not include any indication of any specific terminal device(s)/group(s), but may instead simply include an indication of whether or not an upcoming paging occasion includes any paging message, i.e. the WUS may in effect be considered to apply to all terminal devices associated with the relevant paging occasion (this will in effect restrict power savings to paging occasions where no terminal devices are to be paged). Either way, by using WUS, a terminal device may be expected to consume less energy as it can help avoid unnecessary monitoring/blind decoding of PDCCH (or equivalent depending on the specific implementation at hand). It will be appreciated that WUS can also be used in RRC_INACTIVE mode RRC_CONNECTED mode when DRX is used.

If a terminal device is configured for a long DRX cycle (i.e. a relatively long time between paging occasions), it is possible a terminal device will lose synchronisation with the radio access network to an extent it is unable to decode WUS without first resynchronising to the radio access network. An example of this approach is schematically shown in FIG. 4 whereby a terminal device configured for a relatively long DRX cycle may be configured to wake-up at time u0 to allow time for it to synchronise to the radio access network before u1 so that it can detect any WUS signalling.

Figure 5:
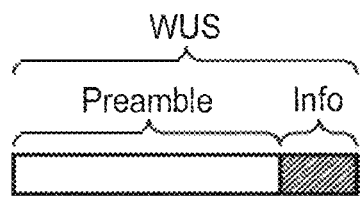
FIG. 5 schematically represents an example format for wake-up signalling (WUS) that may be used in certain embodiments of the disclosure.

FIG. 5 schematically represents an example format for wake-up signals (WUS) that include a signature sequence (preamble) and an information part (info). The preamble part comprises signalling for terminal devices to identify the signalling as a WUS and also, in some implementations, to use to achieve synchronisation with the network (i.e. with the radio network infrastructure equipment transmitting the WUS). The information part comprises an indication of one or more terminal devices to which the WUS applies, e.g. a terminal device identifier and/or an identifier for a group of terminal devices. The terminal device/group identifier(s) may be network allocated identifiers (e.g. radio network temporary identifiers, RNTI) for the terminal device(s), or any other form of suitable identifier, e.g. based on an IMSI for a terminal device. It will be appreciated the format for the wake-up signalling may not conform to that shown in FIG. 5, but may in other implementations have a different format. For example, the wake-up signalling may have a format in which the wake-up signalling comprises a preamble (signature sequence) without a separate information part. Instead, the preamble may itself contain an indication of the identity for the terminal device(s) for which the wake-up signalling indicates a paging message is to be subsequently transmitted, for example with specific WUS preambles (sequences/patterns) configured for specific terminal devices/groups of terminal devices.

Figure 6:
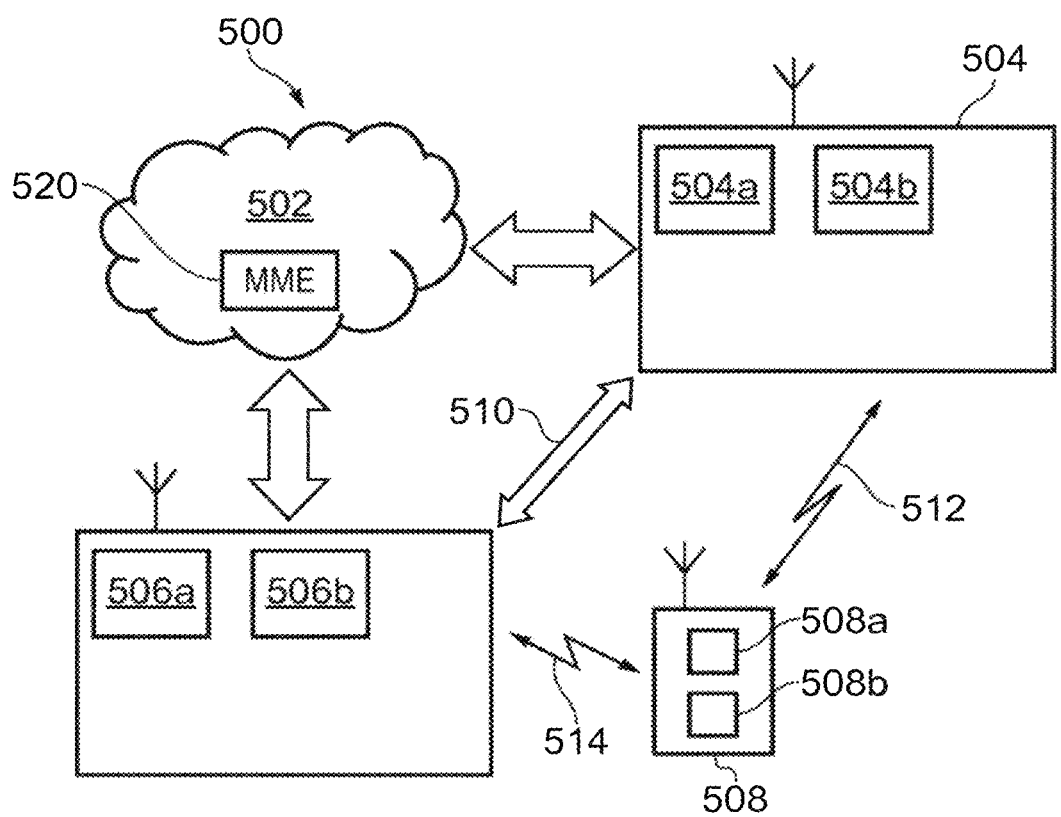
FIG. 6 schematically represents some aspects of a wireless telecommunication system in accordance with certain embodiments of the present disclosure.

FIG. 6 schematically shows some aspects of a telecommunications system 500 configured to support communications between a terminal device 508 and network access nodes 504, 506 in accordance with certain embodiments of the disclosure. Many aspects of the operation of the telecommunications system/network 500 are known and understood and are not described here in detail in the interest of brevity. Aspects of the architecture and operation of the telecommunications system 500 which are not specifically described herein may be implemented in accordance with any previously proposed techniques, for example according to current 3GPP standards and other proposals for operating wireless telecommunications systems/networks. The network access nodes 504, 506 may, for convenience, sometimes be referred to herein as base stations 504, 506, it being understood this term is used for simplicity and is not intended to imply any network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part (evolved packet core) 502 coupled to a radio network part. The radio network part comprises the radio network access nodes 504, 506 and the terminal device 508. It will of course be appreciated that in practice the radio network part may comprise a more than two network access nodes serving multiple terminal devices across various communication cells. However, only a two network access nodes and one terminal device are shown in FIG. 6 in the interests of simplicity.

As with a conventional mobile radio network, the terminal device 508 is arranged to communicate data to and from the network access nodes (base stations/transceiver stations) 504, 506. Typically the terminal device will be operable to connect to (i.e. be able to exchange user plane data with) one network infrastructure element at a time, and so as the terminal device moves around the network it may move in and out of coverage of the different network access nodes comprising the network. The network access nodes 504, 506, are communicatively connected to a serving gateway, S-GW, (not shown) in the core network part which is arranged to perform routing and management of mobile communications services to the terminal devices in the telecommunications system 500 via the network access nodes 504, 506. In order to maintain mobility management and connectivity, the core network part 502 also includes a mobility management entity, MME, 520 which manages the enhanced packet service, EPS, connections with terminal devices operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 6 may be in accordance with known techniques apart from where modified to provide functionality in accordance with embodiments of the present disclosure as discussed herein.

The terminal device 508 is adapted to support operations in accordance with embodiments of the present disclosure when communicating with the network access nodes 504, 506. In this example the terminal device 508 is assumed to be an MTC terminal device. The terminal device 508 may be a dedicated MTC terminal device, such as a wearable technology item, or may be a generic terminal device, such as a smartphone terminal device, running an application that relies on MTC data exchange. Nonetheless, it will be appreciated the principles disclosed herein may also be applied for other types of terminal device (i.e. devices which may not be considered MTC devices). The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 6 in the interests of simplicity.

The network access nodes 504, 506 each comprises transceiver circuitry 504a, 506a (which may also be referred to as a transceiver/transceiver unit) for transmission and reception of wireless signals and processor circuitry 504b, 506b (which may also be referred to as a processor/processor unit) configured to control the respective network access nodes 504, 506 to operate in accordance with embodiments of the present disclosure as described herein. Thus, the processor circuitry 504b, 506b for each network access node 504, 506 may comprise circuitry which is suitably configured/programmed to provide the desired functionality described herein using conventional programming/configuration techniques for equipment in wireless telecommunications systems. For each network access nodes 504, 506 the transceiver circuitry 504a, 506a and the processor circuitry 504b, 506b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated that each of the network access nodes 504, 506 will in general comprise various other elements associated with its operating functionality, such as a scheduler. For example, although not shown in FIG. 6 for simplicity, the processor circuitry 504b may comprise scheduling circuitry, that is to say the processor circuitry 504b may be configured/programmed to provide the scheduling function for the network access node.

The network access nodes 504, 506 are operable to communicate with the terminal device 508 (when in coverage) over respective radio communication links 512, 514. The network access nodes 504, 506 are operable to communicate with each other to share information through a communications link 210 between them. In some network architectures the network nodes may communicate directly with one another, as schematically represented in FIG. 6, while in other network architectures they may communicate with one another indirectly, e.g. via the core network part 502.

As noted above, a WUS comprises a predefined signature sequence/preamble which a terminal device is able to readily detect, e.g., when in a power saving mode (PSM). The specific signature sequence/preamble used in a given implementation may be referred to as a WUS sequence/preamble/pattern, or more generally as a WUS format, for the WUS signalling. A wireless network communications system may be configured so that different radio access nodes are associated with different WUS formats, for example to help avoid neighbouring cell interference. More generally, different radio access nodes may be associated with different WUS configurations, for example also having different periodicities and relative offsets in terms of the timings of WUS signals and associated paging occasions as well as different WUS signalling formats (WUS patterns). Thus, a network access node to which a terminal device is attached may provide the terminal device with cell-specific WUS configuration information so that when the terminal device enters the power saving mode, it has the information necessary to allow it to seek to detect WUS signalling from the network access node. The inventors have recognised a potential issue with this can arise for terminal devices which have a degree of mobility within the telecommunications system such that they may move out of the coverage area associated with a first network access node to the coverage area associated with a second network access node while in the power saving mode. This may occur because the terminal device is physically mobile, or because the terminal device is physically stationary, but nonetheless moves between cells due to changing cell conditions (e.g. so-called ping-ponging at a cell edge). It is expected a terminal device will not make measurements in the power saving mode (beyond seeking to detect WUS signalling), and so the terminal device will not be aware it has moved from the coverage of the first network access node to the coverage of the second network access node. Consequently, the terminal device will continue to seek WUS signalling in accordance with the configuration information settings received from the first network access node. This means the terminal device becomes uncontactable because it cannot receive WUS signalling from the first network access node because of coverage issues, and it cannot receive WUS signalling from the second network access node because it does not have the appropriate WUS configuration (i.e. it is searching for the wrong WUS format, potentially also at the wrong times). One way to overcome this problem would be to only use WUS procedures for static/relatively immobile terminal devices. However, the inventors have recognised there can still be useful power savings available to terminal devices that are mobile (subject to changing cell coverage) if they could also make use of WUS procedures.

Thus, certain embodiments of the disclosure provide a WUS format configured for a terminal device with an associated validity period. When the validity period expires, the terminal device proceeds to establish a new WUS configuration, e.g. by exiting the power saving mode and performing a cell selection/reselection procedure. Thus, if the terminal device has moved to the coverage area of a different network access node, it can obtain the associated new WUS configuration from the new network access node. In this regard it will be appreciated certain embodiments of the disclosure represent a development of previously proposed WUS schemes, and aspects and features of approaches in accordance with embodiments of the disclosure which correspond with aspects and features of existing WUS proposals, for example in terms of determining when WUS signalling is transmitted and the specific WUS formats to use, may be based on existing proposals.

Figure 7:
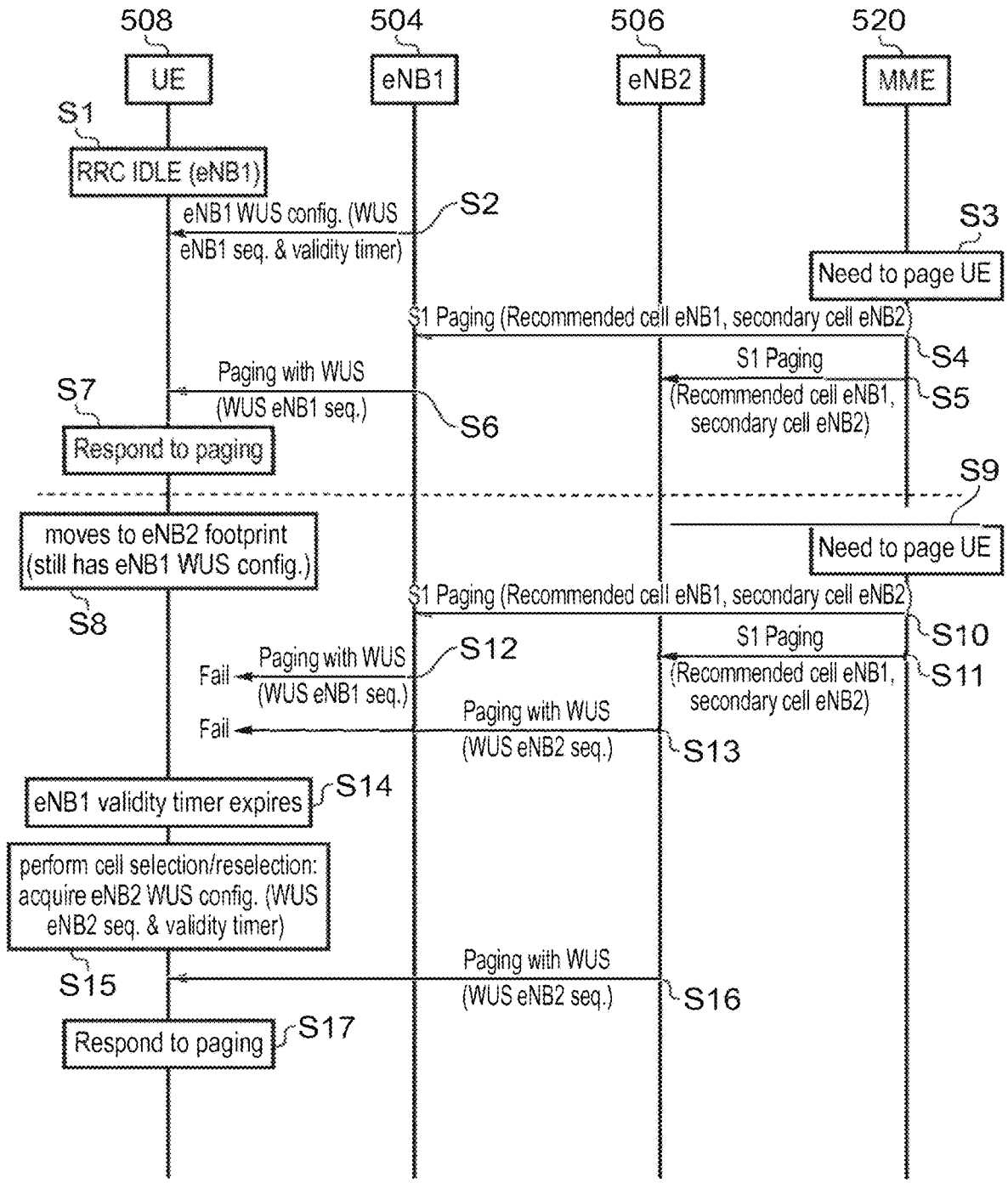
FIGS. 7 and 8 are a signalling ladder diagrams (message sequence charts) schematically representing some operating aspects of wireless telecommunications systems in accordance with certain embodiments of the disclosure.

FIG. 7 is a ladder diagram schematically representing some operating aspects of the wireless telecommunications system 500 discussed above with reference to FIG. 6 in accordance with certain embodiments of the disclosure. In particular, the diagram represents some operations and signalling exchange associated with the terminal device 508, the network access node 504, which for convenience may be referred to here as a first network access node 504, the network access node 506, which for convenience may be referred to here as a second network access node 506, and the MME 520 in the core network 502 in accordance with certain embodiments of the disclosure.

The processing of FIG. 7 starts in step S1 with the terminal device 508 in RRC_IDLE and configured for a discontinuous reception (DRX) mode of operation with the network access node 504 in a manner that uses wake-up signalling (i.e. providing the terminal device with an indication of whether an upcoming paging occasion will include a paging message that may be for the terminal device). This may be generally in accordance with previously proposed techniques, but modified in accordance with embodiments of the disclosure as discussed further herein.

As schematically indicated in step S2, the first network access node transmits WUS configuration information which is received by the terminal device 508. In this example the WUS configuration information is transmitted in a system information broadcast, SIB, message. Thus, in step S2 the terminal device 508 establishes wake-up signalling (WUS) configuration information for the first network access node 504 covering the current location for the terminal device 508. In accordance with certain embodiments of the disclosure the wake-up signalling configuration information comprises an indication of a WUS format (signature sequence) for paging the terminal device via the first network access node and an indication of an associated WUS validity period for the WUS.

After receiving the WUS configuration information the terminal device 508 may enter the power saving mode in which it monitors for signalling transmitted by the first network access node that matches the wake-up signalling format during the wake-up signalling validity period. The monitoring for WUS signalling may be performed in accordance with conventional techniques.

For the example implementation represented in FIG. 7, it is assumed steps S3 to S13 are performed after the terminal device has received the indication of the WUS validity period but before expiry of the WUS validity period.

In step S3 the MME determines a need to page the terminal device. The reason why the terminal device is to be paged is not significant to the principles described herein. For example, there may be data that needs to be transmitted to the terminal device, or there may be a desire to trigger the terminal device to transmit data to the network.

In steps S4 and S5 the MME 520 sends respective paging request messages to the first network access node 504 and the second network access node 506. These paging request messages may be conventional and may include an information element comprising recommended cells for paging. In the example represented in FIG. 7, it is assumed the recommended cells for paging information element indicates the terminal device has most recently connected to the first network access node, and prior to that was connected to the second network access node, although this aspect of the paging request message is not significant for this example embodiment.

In step S6 the first network access node 504 pages the terminal device 508 using the WUS procedure. That is to say the first network access node 504 transmits a WUS in accordance with the WUS format and timings defined in the WUS configuration information transmitted to the terminal device in step S2, and follows this with a paging message in the relevant paging occasion. This aspect of the processing of FIG. 7 may be performed in accordance with previously proposed techniques for paging using WUS.

In step S7 the terminal device responds to the paging message received in step S6 in the conventional way, and after any further signalling associated with the cause for the paging is completed, the terminal device may return to RRC_IDLE mode in which it in which it continues to monitor for WUS signalling for any further paging events. When the terminal device returns to RRC_IDLE having entered RRC_CONNECTED mode in response to the paging message, the terminal device may, for example, continue to use the existing WUS configuration information from step S2 (in which case the counter for the validity timer may in some implementations be reset), or use new/updated WUS configuration information. New/updated WUS configuration information may, for example, be received in an RRC message, e.g. an RRC connection release message when in RRC_CONNECTED mode in response to the paging message, or in a cell selection/reselection procedure after returning to RRC_IDLE mode, Thus, the processing of steps S3 to S7 represents the successful completion of a paging event for the terminal device using WUS.

In the example processing represented in FIG. 7, it is assumed in step S8 the terminal device moves out of the coverage area of the first network access node 504 and into the coverage area of the second network access node 506. As noted above, this may occur due to physical movement of the terminal device or due to changing radio conditions impacting the coverage areas of the respective network access nodes. Because the terminal device is operating in a power saving mode, the terminal device does not know that it has moved out of coverage of the first network access node and into coverage of the second network access node, and consequently nor does the MME or any other network infrastructure element know this.

In step S9 the MME determines a need to page the terminal device again. The reason why the terminal device is to be paged is again not significant to the principles described herein.

In the same way as discussed above for steps S4 and S5, in steps S10 and S11 the MME 520 sends respective paging request messages to the first network access node 504 and the second network access node 506. These paging request messages may again be conventional and may include an information element comprising an indication of recommended cells for paging (representing an order of most recently visited cells). As noted above, in the example represented in FIG. 7, it is assumed the terminal device has most recently connected to the first network access node, and prior to that was connected to the second network access node, although this aspect of the paging request message is not significant to this example embodiment.

In step S12 the first network access node 504 attempts to page the terminal device 508 using WUS in accordance with the WUS configuration settings provided to the terminal device in step S2. However this paging attempt fails because the terminal device is not in coverage of the first network access node.

In step S13 the second network access node 506 attempts to page the terminal device 508 using WUS in accordance with its own WUS configuration settings. However, this paging attempt also fails because the terminal device is not monitoring for signalling with the relevant WUS format (as noted above, this is an issue that can arise for non-stationary terminal devices in networks having cell-specific WUS sequences). In some implementations the second network access node might simply determine it cannot page the terminal device, for example because it recognises it has not previously provided the terminal device with the relevant WUS configuration information, and so may not even attempt to page the terminal device (i.e. there may be no signalling corresponding to step S13 in some implementations).

Thus, the terminal device has in effect become non-contactable and remains non-contactable up until the expiry of its configured WUS validity period (unless it happens to return to the coverage area of the first network access node and the first network access node is still attempting to page the terminal device).

In step S14 the configured WUS validity period for the terminal device expires.

In step S15, in response to the terminal device determining the WUS validity period has expired, the terminal device performs a cell selection/reselection procedure, which may be performed conventionally. Thus the terminal device takes measurements and selects the second network access node to attach to (since in this example this is the network access node covering the current location for the terminal device following step S8). As part of this procedure the terminal device decodes system information broadcasts, SIBs, for the second network access node, from which it establishes WUS configuration information for the second network access node in the same manner as discussed above in relation to step S2 for the first network access node (as schematically indicated within step S15). In the same way as for the WUS configuration information received by the terminal device from the first network access node in step S2, the WUS configuration information received by the terminal device from the second network access node in step S15 comprises an indication of a WUS format (signature sequence) for the paging the terminal device via the second network access node and an indication of an associated WUS validity period for the WUS.

Thus, having moved into the coverage area of the second network access node in step S8, and having received the WUS configuration information for the second network access node in step S15, the terminal device may enter the power saving mode in which it monitors for signalling transmitted by the second network access node that matches the corresponding wake-up signalling format (i.e. as indicated in the WUS configuration information established in step S15) for the associated wake-up signalling validity period. As noted above, this monitoring for WUS signalling may itself be performed in accordance with conventional techniques, for example using a suitable correlator process.

In step S16 the second network access node 506 pages the terminal device 508 using the WUS procedure. That is to say the second network access node 506 transmits a WUS in accordance with the WUS format and timings defined in the WUS configuration information established by the terminal device in step S15, and follows this with a paging message in the relevant paging occasion. This aspect of the processing of FIG. 7 may be performed in accordance with previously proposed techniques for paging using WUS. The paging message transmitted in step S16 may be transmitted by the second network access node as part of a series of attempts to page the terminal device following the signalling received in step S11, or in response to a further paging request message received from the MME 520 (not shown in FIG. 7), for example in a re-attempt to page the terminal device triggered by the MME in a situation in which the initial paging attempt associated with step S9 is deemed to have failed/timed out because the terminal device did not respond within a threshold period. In that regard it will be appreciated the overall paging strategy, for example in terms of which network access nodes are requested to page the terminal device, when they should do so, and how many attempts they should make, in any given scenario is not significant to the principles described herein.

In step S17 the terminal device responds to the paging message received in step S16 in the conventional way, and after any further signalling associated with the cause for the paging is completed, the terminal device returns to the power saving mode in which it continues to monitor for WUS signalling (in accordance with the WUS configuration information settings associated with the second network access node) for any further paging events.

Thus, the processing of steps S9 to S16 represents the successful completion of a paging event for the terminal device using WUS, despite the terminal device initially being non-contactable because it has moved out of coverage of the network access node for which it was configured to receive WUS signalling.

Thus, the approach set out above of using a validity timer for a WUS format allows the terminal device to recover from a situation in which it would otherwise have become non-contactable.

It will be appreciated the processing represented in FIG. 7 sets out only some of the steps involved in the procedure, and for simplicity and ease of representation, some steps performed in accordance with this example implementation are not shown in FIG. 7 or amalgamated into fewer steps. For example, in addition to the paging message transmitted from the first network access node in step S6, there may also be a paging message transmitted from the second network access node in response to the paging request message received by the second network access node in step S5.

Furthermore, whereas in the example represented in FIG. 7 the terminal device is assumed to have moved from the coverage area of the first network access node to the coverage area of a different network access node when the validity timer expires, in another scenario the terminal device may remain within the coverage area of the first network access node when the validity timer expires. However, the processing discussed above with reference to FIG. 7 may be the same, the only difference being that in this scenario the first network access node and the second network access node are in fact the same network access node (and consequently the WUS configuration information received in steps S2 and S15 may be the same).

The duration of the wake-up signalling validity period for the terminal device may be selected by the respective network access nodes having regard to an estimated/expected mobility for the terminal device. Furthermore, the validity period/validity timer may be common to a plurality of terminal devices or may be specific to individual terminal devices. A terminal device provided with a terminal device specific validity period may use this in preference to any common with the period it has also received.

The estimated mobility for a terminal device may be determined in a number of ways, for example based on a defined mobility classification type for the terminal device, e.g. as received from the MME or from the terminal device (e.g. as capability information). For example, the terminal device may be identified as a smart meter terminal device, in which case it may be considered to be stationary and configured with a relatively long validity period (potentially an infinite validity period, i.e. a validity period which never expires, for a terminal device which is considered to be truly stationary). Conversely, the terminal device may be identified as a location tracking device, in which case it may be considered to be relatively mobile and configured with a correspondingly relatively short validity period. In addition to these examples, there is a range of further information provided to network access nodes in accordance with conventional approaches which can be used by the network access node to establish an estimated degree of mobility for a terminal device. For example, assistance data for paging that provides a list of previously-visited network access nodes/cells (recommended cells for paging) and time spent in a cell (time stayed in cell), provide an indication of historic mobility that a network access node may assume can be expected to continue.

Different values for the validity period will depend on implementation. For example, in some cases the WUS validity period may be selected to have a value in a range broadly corresponding to the validity period for SIB, e.g. from around 3 hours to around 24 hours. In other cases shorter periods may be appropriate, for example corresponding to a multiple of a paging time window, e.g. from around a few second to a minute or so, or corresponding to a multiple of a DRX cycle, e.g. from around a few millisecond to a minute or so.

Figure 8:
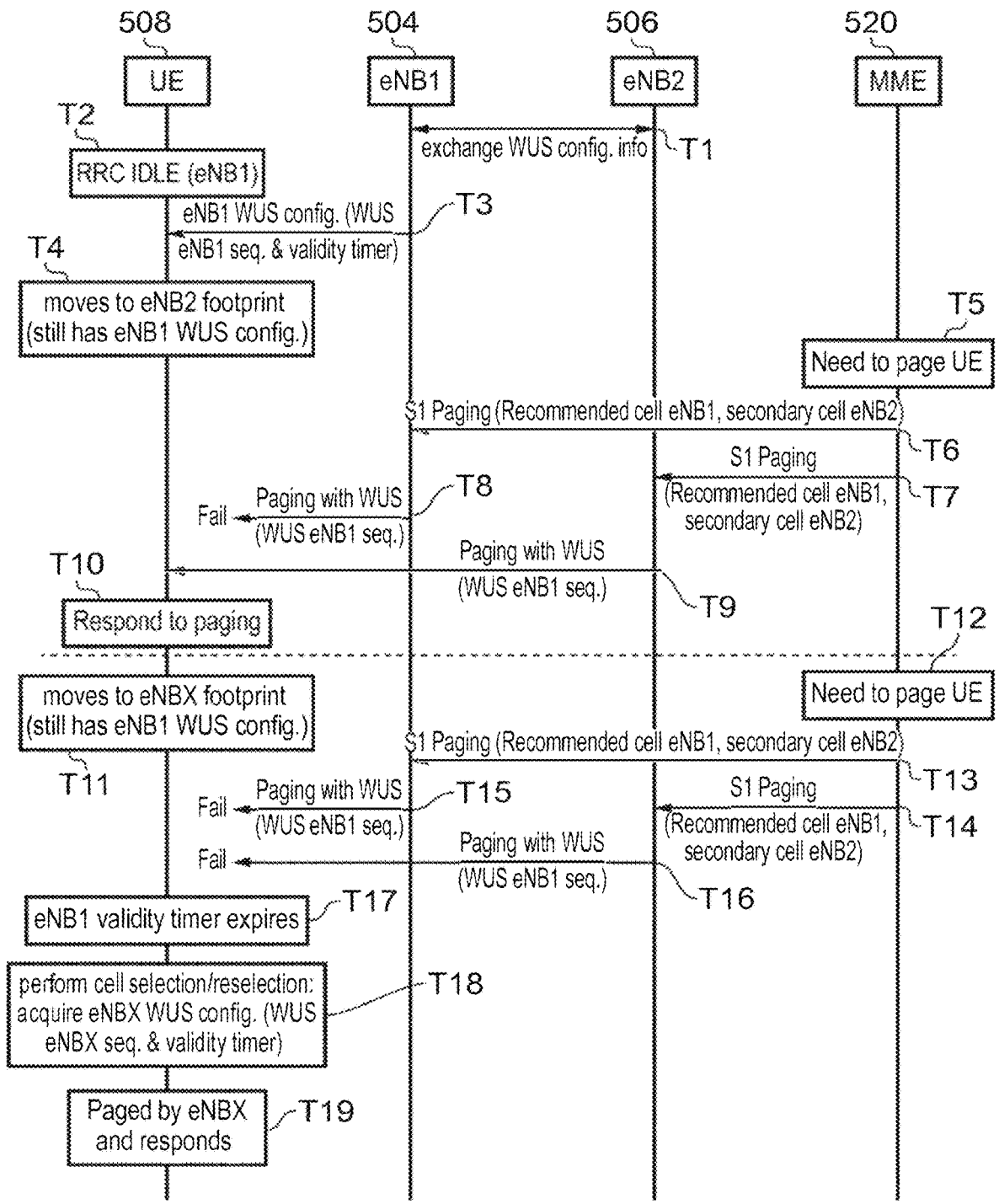

FIG. 8 is a ladder diagram schematically representing some operating aspects of the wireless telecommunications system 500 as discussed above with reference to FIG. 6 in accordance with certain embodiments of the disclosure. Various aspects of FIG. 8 are similar to, and will be understood from, corresponding aspects of FIG. 7. However, FIG. 8 represents a modified approach to that represented in FIG. 7, for example which may be beneficial for a terminal device which is relatively stationary, but located around the boundary of coverage between the first network access node and the second network access node such that the terminal device may move between their respective coverage areas relatively frequently due to changing radio conditions, but does not generally move into coverage of other cells.

The processing of FIG. 8 starts in step T1 in which the first network access node and the second network access node exchange WUS configuration information for the terminal device such that the first network access node is made aware of the WUS configuration information for the second network access node (or at least the format of its WUS signalling for the terminal device), and the second network access node is made aware of the WUS configuration information for the first network access node (or at least the format of its WUS signalling for the terminal device). This information may be exchanged using conventional techniques for exchanging information between network access nodes, e.g. across an X2 interface, for example during an X2 setup procedure if the WUS configuration information is relatively static.

Step T2 in FIG. 8 corresponds with, and will be understood from, step S1 in FIG. 7 and is not discussed again the interest of brevity.

Step T3 in FIG. 8 corresponds with, and will be understood from, step S2 in FIG. 7 and is not discussed again the interest of brevity. Thus, in the same as discussed above for the example of FIG. 7, after receiving the WUS configuration information in step T3, the terminal device 508 may enter the power saving mode in which it monitors for signalling transmitted by the first network access node that matches the relevant wake-up signalling format during the wake-up signalling validity period. Again, the monitoring for WUS signalling may itself be performed in accordance with conventional techniques.

For the example implementation represented in FIG. 8, it is assumed steps T4 to T16 performed after the terminal device has received the indication of the WUS validity period in step T3 occur prior to expiry of the WUS validity period.

In the example processing represented in FIG. 8, it is assumed in step T4 the terminal device moves out of the coverage area of the first network access node 504 and into the coverage area of the second network access node 506. This may occur due to physical movement of the terminal device, but in this example is assumed to occur due to changing radio conditions impacting the coverage areas of the respective network access nodes, although this is itself not directly relevant to the principles described herein. Because the terminal device is operating in a power saving mode, the terminal device does not know that it has moved out of coverage of the first network access node and into coverage of the second network access node, and consequently nor does the MME or any other network infrastructure element know this.

Step T5 in FIG. 8 corresponds with, and will be understood from, step S3 in FIG. 7 and is not discussed again the interest of brevity.

Steps T6 and T7 in FIG. 8 respectively correspond with, and will be understood from, steps S4 and S5 in FIG. 7 and are not discussed again the interest of brevity.

Step T8 in FIG. 8 corresponds with, and will be understood from, step S12 in FIG. 7. Thus in step T8 the first network access node 504 attempts to page the terminal device 508 using WUS in accordance with the WUS configuration settings provided to the terminal device in step T3. However this paging attempt fails because the terminal device is not in coverage of the first network access node (this step corresponds with and will be understood from step S12 discussed above).

In step T9 in FIG. 8, and in response to receiving the paging request message in step T7, the network access node station 506 transmits a paging message using WUS to the terminal device 508. However, and in a departure from the processing represented in FIG. 7, in step T9 the second network access node 506 transmits the WUS in accordance with the WUS configuration associated with the first network access node, i.e. making use of the information received in step T1. This allows the terminal device to successfully receive the paging message because the terminal device is in coverage of the second network access node and monitoring for WUS signalling in accordance with the configuration information for the first network access node provided to the terminal device in step T3. In this example the second network access node is able to determine that it should use the WUS configuration settings for the first network access node, rather than its own WUS configuration settings, from an indication received in association with the paging request message from the MME in step T7. In particular, and as noted above, in accordance with conventional techniques, the paging message of step T7 includes an indication of recommended cells for paging based on which network access nodes the terminal device was most recently connected to. Thus, in accordance with certain embodiments of the disclosure, the second network access node may determine that it should transmit wake-up signalling for the terminal device in accordance with the first wake-up signalling format in step T9 from the paging request message from the MME indicating the first network access node is the network access node to which the terminal device was most recently connected.

In step T10 the terminal device responds to the paging message received in step T9, and after any further signalling associated with the cause for the paging is completed the terminal device returns to the power saving mode in which it in which it continues to monitor for WUS signalling for any further paging events. Depending on the implementation at hand, on determining the terminal device has received the paging message in step T9 from a network access node which is not the network access node which provided the WUS configuration information, the terminal device may be configured to decode system information for the second network access node to facilitate the exchange of subsequent paging message signalling. In some implementation, the terminal device may be configured with an updated WUS configuration from the second network access node and the validity timer may be updated.

Thus, the processing of steps T5 to T10 represents the successful completion of a paging event for the terminal device using WUS, despite the terminal device moving out of coverage of the network access node for which it was initially configured to receive WUS signalling.

In the example processing represented in FIG. 8, assumed in step T11 the terminal device moves out of the coverage area of both the first network access node 504 and the second network access node 504 and into the coverage area of a third network access node (eNBX)—not shown in the figures, and which may, for example, be in a different tracking area to the first and second network access nodes. As noted above, this may occur due to physical movement of the terminal device or due to changing radio conditions impacting the coverage areas of the respective network access nodes. Because the terminal device is operating in a power saving mode, the terminal device does not know that it has moved out of coverage of the first and second network access nodes and into coverage of the third network access node, and consequently nor does the MME or any other network infrastructure element know this.

In step T12 the MME determines a need to page the terminal device. The reason why the terminal device is to be paged is again not significant to the principles described herein.

In the same way as discussed above for steps T6 and T7, in steps T13 and T14 the MME 520 sends respective paging request messages to the first network access node 504 and the second network access node 506. These paging request messages may again be conventional and may include an information element comprising an indication of recommended cells for paging.

In step T15 the first network access node 504 attempts to page the terminal device 508 using WUS in accordance with the WUS configuration settings provided to the terminal device in step T3. However this paging attempt fails because the terminal device is not in coverage of the first network access node.

In step T16 the second network access node 506 attempts to page the terminal device 508 using WUS in accordance with the WUS configuration settings for the first network access node as received in step T1. In that sense, step T16 is similar to, and will be understood from, step T9, except unlike the paging attempt in step T9, the paging attempt in step T16 fails because the terminal device is not in coverage of the second network access node.

Although not shown in FIG. 8, and depending on the paging strategy for the MME, the third network access node may also receive a paging request message for the terminal device from the MME and attempt to page the terminal device, but this too will fail because even though the terminal device is in coverage of the third network access node (eNBX), the third network access node in this example does not know the relevant WUS configuration settings to page the terminal device.

Thus, the terminal device is in effect non-contactable at this stage and remains non-contactable until the expiry of its configured WUS validity period (unless it happens to return to the coverage area of the first or second network access node while they are still attempting to page the terminal device).

In step T17 the configured WUS validity period for the terminal device expires.

In step T18, in response to the terminal device determining the WUS validity period has expired, the terminal device performs a cell selection/reselection procedure, which may be performed conventionally. Thus the terminal device takes measurements and selects the third network access node to attach to (since in this example this is the network access node covering the current location for the terminal device following step T11). As part of this procedure the terminal device decodes system information broadcasts, SIBs, for the third network access node, thereby establishing WUS configuration information for the third network access node in the same manner as discussed above in relation to step T3 for the first network access node (as schematically indicated in step T18). As for the WUS configuration information received by the terminal device from the first network access node in step T3, the WUS configuration information received by the terminal device from the third network access node in step T18 comprises an indication of a WUS format (signature sequence) for paging the terminal device via the third network access node and an indication of an associated WUS validity period for the WUS.

Thus, having moved into the coverage area of the third network access node in step T11, and having received the WUS configuration information for the third network access node in step T18, the terminal device may enter the power saving mode in which it monitors for signalling transmitted by the third network access node that matches the corresponding wake-up signalling format (i.e. as indicated in the WUS configuration information established in step T18) for the associated wake-up signalling validity period. As noted above, this monitoring for WUS signalling may itself be performed in accordance with conventional techniques, for example using a suitable correlator process.

In step T19 the third network access node 506 pages the terminal device 508 using the WUS procedure and the terminal device responds accordingly. That is to say the third network access node 506 transmits a WUS in accordance with the WUS format and timings defined in the WUS configuration information established by the terminal device in step T18, and follows this with a paging message in the relevant paging occasion. The paging message transmitted in step T19 may be transmitted, for example, in response to a paging request message received from the MME 520 (not shown in FIG. 8), for example in a re-attempt to page the terminal device triggered by the MME over a wider scale after the initial paging attempt associated with step T12 is deemed to have failed/timed out because the terminal device did not respond within a threshold period. The terminal device may respond to the paging message in step T19 in the conventional way, and afterwards the terminal device may return to the power saving mode in which it in which it continues to monitor for WUS signalling (in accordance with the WUS configuration information settings associated with the third network access node) for any further paging events.

Thus, the processing of steps T12 to T19 represents the successful completion of a paging event for the terminal device using WUS, despite the terminal device initially being non-contactable because it has moved out of coverage of the first and second network access nodes.

It will be appreciated there are various modifications that may be made to the processes described herein in accordance with other example implementations.

For example, whereas the processing discussed above with reference to FIG. 7 concerns a terminal device in RRC_IDLE mode in step S1, the same approach may be used for a terminal device starting in RRC_INACTIVE mode.

Furthermore, whereas the WUS configuration information from the network access node is provided to the terminal device in a system information broadcast, SIB, message in step S2 in FIG. 7, the WUS configuration information may also be provided to the terminal device in other ways, for example through radio resource control, RRC, signalling from an earlier time when the terminal device was in RRC_CONNECTED mode.

Furthermore, whereas the example of FIG. 8 shows two network access nodes sharing aspects of their WUS configuration information, for example for a terminal device that frequently moves between them, the same approach may be used with more network access nodes sharing aspects of their WUS configuration information, for example for a terminal device that frequently moves between more than two network access nodes.

Furthermore, whereas in the examples described above the terminal device seeks to establish new/updated WUS configuration information when WUS validity timer expires, in some example implementations the terminal device may instead be configured on expiry of the validity timer to assume it should start to monitor for paging messages in the conventional way, i.e. in effect without making use of WUS. That is to say, in response to determining the first wake-up signalling validity period has expired, monitoring for subsequent paging messages regardless of whether wake-up signalling in accordance with the first wake-up signalling format is detected.

Furthermore, whereas in the examples discussed above the selection of the validity period may be based on an estimated mobility, in other examples the validity period may be selected based on other characteristics, such as a type of service the terminal device uses and/or how much paging delay is acceptable for the terminal device, i.e. what may be referred to generally as terminal device context awareness.

Thus, to summarise some aspects of certain embodiments of the disclosure, a WUS validity timer is proposed. Two example UE mobility states may be considered e.g. UE1 (stationary/relatively stationary) and UE2 (mobile/relatively mobile). If both these UEs are configured for the same WUS validity timer then either UE1 will be configured to wake up more frequently than it could, or UE2 would be relatively likely to become untraceable in the network so that paging takes longer time and more resources than it could. Thus some embodiments of the disclosure propose to configure a WUS validity timer in the UE with different values for different UEs (depending on mobility). For example, UE1 (relatively stationary) may have what is in effect a close to infinite value while UE2 (relatively mobile) might be configured with smaller duration WUS validity timer. On expiry of WUS validity timer, UE performs measurements and a cell selection/reselection procedure. It will be appreciated there may in general be more than two mobility states, and indeed there may be continuum of mobility states and corresponding WUS validity timer durations.

The WUS validity timer may be configured along with WUS configuration by the eNB (e.g. in DRX-config), for example with no involvement of the MME and may be configured to a UE when it goes to Connected mode and receives DRX-config, or for a UE in RRC_IDLE mode then cell specific WUS signals may be transmitted in system information.

In another embodiment, the MME and eNB may coordinate the WUS validity timer and provide it to the terminal device in access stratum (AS) or non-access stratum (NAS) signalling depending on implementation. For NAS signalling an attach procedure may be used.

Although the above examples have considered a single WUS configuration for a UE, a plurality of validity timer can be configured for multiple WUSes if the UE is being configured with more than one WUS. That is if the UE is configured to monitor multiple WUSes (e.g. WUS from its neighbour cells) then each WUS can have a separate validity timer.

In another example where multiple WUSes are configured, the WUSes can be grouped into a validity timer. That is a validity timer may be used for a group of WUSes.

The eNB can decide different values of WUS validity timer for different UEs in various ways.

For example, this may be linked to UE mobility, expected services and type of IoT (Internet of Things) device. For example if UE is a utility meter, it may have a relatively long validity timer. In contrast if a UE is a tracking device it may have a relatively short validity timer. If a UE is expected to be paged relatively frequently it may not even be configured with a WUS).

Also, as is known, an eNB receives Expected UE Behaviour information during Initial Context Setup from an MME and aspects of this may be used to derive an estimated UE mobility, and from this a validity period. For example, based on an Expected HO Interval information element received from the MME.

In some embodiments, the UE may indicate its mobility level to the eNB thereby helping the eNB to set an appropriate WUS validity timer.

In some embodiments, the network may configure a WUS validity timer taking into account a Paging response timer so that the number of Paging attempts can be optimised. In addition, WUS validity timer value may be set by profiling UE activities.

On expiry of the WUS validity timer the UE may be configured to: 1. Perform radio measurements (RSRP, RSRQ, SINR etc.); 2. Perform cell selection/reselection; 3. Perform TA (tracking area) update if relevant; 4. Acquire new WUS and validity timer.

In some cases, a UE may initiate a random access procedure following selection of a new cell request the new cell to send it was information (e.g. using so-called on-demand SIB).

The approaches described herein do not rely on significant changes to the MME entity, which can be considered preferential the MME entity in such a core component of a network. However, in other examples the MME may be modified to support approaches in accordance with the described herein. For example, UE subscription information (e.g. if the UE is an energy meter or IoT sensor or normal smartphone etc.) may be stored on the network side and used by the MME to determine a mobility state for each UE and this may be provided to the prospective network access nodes when the UEs move to RRC_CONNECTED mode, and the eNB may use this information to configure the WUS validity timer having regard to the UE mobility state.

An eNB may receive explicit information regarding the UE mobility state in a S1: PAGING message about UE mobility state and can additionally check for Paging response from a stationary UE by matching the UE-identity in S1: Paging message and UE identity used in RRC Connection procedure. If no response is detected then eNB may forward the Paging request to neighbouring base stations using X2 interface.

Thus there has been described a method of operating a terminal device in a wireless telecommunications system comprising the terminal device and a plurality of network access nodes, wherein the method comprises: establishing first wake-up signalling configuration information for a first network access node, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format; monitoring for signalling transmitted by one of the plurality of network access nodes in accordance with the first wake-up signalling format during the first wake-up signalling validity period, and seeking to decode a subsequent paging message if wake-up signalling in accordance with the first wake-up signalling format is detected in this period; establishing second wake-up signalling configuration information for a second network access node in response to determining the first wake-up signalling validity period has expired, wherein the second wake-up signalling configuration information comprises an indication of a second wake-up signalling format to be transmitted by the second network access node in advance of transmitting a paging message to indicate the terminal device should seek to decode the paging message, and an indication of an associated second wake-up signalling validity period for the second wake-up signalling format; and monitoring for signalling transmitted by one of the plurality of network access nodes in accordance with the second wake-up signalling format during the second wake-up signalling validity period, and seeking to decode a subsequent paging message if wake-up signalling in accordance with the second wake-up signalling format is detected in this period.

There has also been described a method of operating a first network access node in a wireless telecommunications system comprising a terminal device and a plurality of network access nodes, wherein the method comprises: establishing an estimated mobility for the terminal device; determining first wake-up signalling configuration information for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format, wherein the first wake-up signalling validity period is determined from the estimated mobility for the terminal device, whereby a higher estimated mobility for the terminal device is associated with a shorter first wake-up signalling validity period than a lower estimated mobility for the terminal device; and transmitting an indication of the first wake-up signalling configuration information to the terminal device.

There has also been described a method of operating a second network access node in a wireless telecommunications system comprising a terminal device and a plurality of network access nodes, wherein the method comprises: receiving from a first network access node an indication of first wake-up signalling configuration information for the first network access node, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format, receiving from a mobile management entity for the wireless telecommunications system a paging request message for the terminal device before the wake-up signalling validity period has expired, wherein the paging request message indicates the second network access node should transmit wake-up signalling for the terminal device in accordance with the first wake-up signalling format in advance of transmitting a paging message for the terminal device; and transmitting wake-up signalling for the terminal device in accordance with the first wake-up signalling format and subsequently transmitting a paging message for the terminal device.

It will be appreciated that while the present disclosure has in some respects focused on implementations in an LTE-based and/or 5G network for the sake of providing specific examples, the same principles can be applied to other wireless telecommunications systems.

Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/ predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications system comprising the terminal device and a plurality of network access nodes, wherein the method comprises: establishing first wake-up signalling configuration information for a first network access node covering a current location for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format; and monitoring for signalling transmitted by one of the plurality of network access nodes in accordance with the first wake-up signalling format during the first wake-up signalling validity period, and seeking to decode a subsequent paging message if wake-up signalling in accordance with the first wake-up signalling format is detected.

Paragraph 2. The method of paragraph 1, further comprising: in response to determining the first wake-up signalling validity period has expired, monitoring for subsequent paging messages regardless of whether wake-up signalling in accordance with the first wake-up signalling format is detected.

Paragraph 3. The method of paragraph 1, further comprising: in response to determining the first wake-up signalling validity period has expired, establishing second wake-up signalling configuration information for a second network access node covering a current location for the terminal device, wherein the second wake-up signalling configuration information comprises an indication of a second wake-up signalling format to be transmitted by the second network access node in advance of transmitting a paging message to indicate the terminal device should seek to decode the paging message, and an indication of an associated second wake-up signalling validity period for the second wake-up signalling format; and monitoring for signalling transmitted by one of the plurality of network access nodes in accordance with the second wake-up signalling format during the second wake-up signalling validity period, and seeking to decode a subsequent paging message if wake-up signalling in accordance with the second wake-up signalling format is detected.

Paragraph 4. The method of paragraph 3, wherein the first network access node still covers the location for the terminal device when it is determined the first wake-up signalling validity period has expired so that the first and second network access nodes are the same network access node.

Paragraph 5. The method of paragraph 3, wherein the terminal device moves during the first wake-up signalling validity period such that the first network access node no longer covers the location for the terminal device when it is determined the first wake-up signalling validity period has expired so that the first and second network access nodes are different network access nodes.

Paragraph 6. The method of any of paragraphs 1 to 5, wherein the terminal device establishes the first wake-up signalling configuration information from system information broadcast, SIB, signalling transmitted by the first network access node.

Paragraph 7. The method of any of paragraphs 1 to 5, wherein the terminal device establishes the first wake-up signalling configuration information from radio resource control, RRC, signalling transmitted by the first network access node.

Paragraph 8. The method of any of paragraphs 1 to 7, further comprising in response to detecting wake-up signalling in accordance with the first wake-up signalling format in the first wake-up signalling validity period determining whether the detected wake-up signalling is transmitted by a network access node other than the first network access node, and if so, seeking to decode system information from the network access node that transmitted the detected wake-up signalling to facilitate the exchange of subsequent paging message signalling.

Paragraph 9. The method of any of paragraphs 1 to 8, wherein the duration of the first wake-up signalling validity period is derived from an estimated mobility for the terminal device and/or a context awareness for the terminal device.

Paragraph 10. The method of any of paragraphs 1 to 9, further comprising the terminal device performing a cell selection/reselection procedure to establish the second wake-up signalling configuration information for the second network access node when it is determined the first wake-up signalling validity period has expired.

Paragraph 11. The method of any of paragraphs 1 to 10, wherein in response to detecting signalling transmitted by one of the plurality of network access nodes in accordance with the first wake-up signalling format during the first wake-up signalling validity period, and decoding a subsequent paging message, the terminal device responds to the paging message, and then establishes updated wake-up signalling configuration information and monitors for signalling transmitted by one of the plurality of network access nodes in accordance with the updated wake-up signalling information, wherein the updated wake-up signalling configuration information is established from one or more of: (i) the first wake-up signalling configuration information, (ii) RRC signalling associated with the paging response, and (iii) a cell selection/reselection procedure performed after responding to the paging message.

Paragraph 12. A terminal device for use in a wireless telecommunications system comprising the terminal device and a plurality of network access nodes, wherein the terminal device comprises controller circuitry and transceiver circuitry configured to operate together such that the terminal device is operable to: establish first wake-up signalling configuration information for a first network access node covering a current location for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format; and monitor for signalling transmitted by one of the plurality of network access nodes in accordance with the first wake-up signalling format during the first wake-up signalling validity period, and seek to decode a subsequent paging message if wake-up signalling in accordance with the first wake-up signalling format is detected.

Paragraph 13. Circuitry for a terminal device for use in a wireless telecommunications system comprising the terminal device and a plurality of network access nodes, wherein the circuitry comprises controller circuitry and transceiver circuitry configured to operate together such that the circuitry is operable to: establish first wake-up signalling configuration information for a first network access node covering a current location for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format; and monitor for signalling transmitted by one of the plurality of network access nodes in accordance with the first wake-up signalling format during the first wake-up signalling validity period, and seek to decode a subsequent paging message if wake-up signalling in accordance with the first wake-up signalling format is detected.

Paragraph 14. A method of operating a first network access node in a wireless telecommunications system comprising a terminal device and a plurality of network access nodes, wherein the method comprises: establishing an indication of an estimated mobility for the terminal device; determining first wake-up signalling configuration information for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format, wherein the first wake-up signalling validity period is determined from the indication of the estimated mobility for the terminal device, whereby an indication of a higher estimated mobility for the terminal device is associated with a shorter first wake-up signalling validity period than an indication of a lower estimated mobility for the terminal device; and transmitting an indication of the first wake-up signalling configuration information to the terminal device.

Paragraph 15. The method of paragraph 14, wherein the wireless telecommunications system comprises a mobility management entity, and the indication of the estimated mobility for the terminal device is established from information regarding the expected mobility for the terminal device received by the first network access node from the mobility management entity.

Paragraph 16. The method of paragraph 14 or 15, wherein the indication of the estimated mobility for the terminal device is established from information regarding the expected mobility for the terminal device received by the first network access node from the terminal device.

Paragraph 17. The method of any of paragraphs 14 to 16, wherein the indication of the estimated mobility for the terminal device is established from a terminal device type classification for the terminal device.

Paragraph 18. The method of any of paragraphs 14 to 17, further comprising the first network access node conveying an indication of the first wake-up signalling format to a second network access node operating in the wireless telecommunications system.

Paragraph 19. A first network access node for use in a wireless telecommunications system comprising a terminal device and a plurality of network access nodes, wherein the first network access node comprises controller circuitry and transceiver circuitry configured to operate together such that the first network access node is operable to: establish an indication of an estimated mobility for the terminal device; determine first wake-up signalling configuration information for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format, wherein the first wake-up signalling validity period is determined from the estimated mobility for the terminal device, whereby an indication of a higher estimated mobility for the terminal device is associated with a shorter first wake-up signalling validity period than an indication of a lower estimated mobility for the terminal device; and transmit an indication of the first wake-up signalling configuration information to the terminal device.

Paragraph 20. Circuitry for a first network access node for use in a wireless telecommunications system comprising a terminal device and a plurality of network access nodes, wherein the circuitry comprises controller circuitry and transceiver circuitry configured to operate together such that the circuitry is operable to: establish an indication of an estimated mobility for the terminal device; determine first wake-up signalling configuration information for the terminal device, wherein the first wake-up signalling configuration information comprises an indication of a first wake-up signalling format to be transmitted by the first network access node in advance of transmitting a paging message to indicate the terminal device should seek to decode the paging message, and an indication of an associated first wake-up signalling validity period for the first wake-up signalling format, wherein the first wake-up signalling validity period is determined from the estimated mobility for the terminal device, whereby an indication of a higher estimated mobility for the terminal device is associated with a shorter first wake-up signalling validity period than an indication of a lower estimated mobility for the terminal device; and transmit an indication of the first wake-up signalling configuration information to the terminal device.

Paragraph 21. A method of operating a second network access node in a wireless telecommunications system comprising a terminal device and a plurality of network access nodes, wherein the method comprises: receiving from a first network access node an indication of first wake-up signalling configuration information for the first network access node, wherein the first wake-up signalling configuration information comprises an indication of a first wake-up signalling format to be transmitted by the first network access node in advance of transmitting a paging message to indicate the terminal device should seek to decode the paging message, receiving from a mobile management entity for the wireless telecommunications system a paging request message for the terminal device, wherein the paging request message indicates the second network access node should transmit wake-up signalling for the terminal device in accordance with the first wake-up signalling format in advance of transmitting a paging message for the terminal device; and transmitting wake-up signalling for the terminal device in accordance with the first wake-up signalling format and subsequently transmitting a paging message for the terminal device.

Paragraph 22. The method of paragraph 21, wherein the indication the second network access node should transmit wake-up signalling for the terminal device in accordance with the first wake-up signalling format comprises an indication the first network access node is the network access node to which the terminal device was most recently connected.

Paragraph 23. A second network access node for use in a wireless telecommunications system comprising a terminal device and a plurality of network access nodes, wherein the second network access node comprises controller circuitry and transceiver circuitry configured to operate together such that the second network access node is operable to: receive from a first network access node an indication of first wake-up signalling configuration information for the first network access node, wherein the first wake-up signalling configuration information comprises an indication of a first wake-up signalling format to be transmitted by the first network access node in advance of transmitting a paging message to indicate the terminal device should seek to decode the paging message, receive from a mobile management entity for the wireless telecommunications system a paging request message for the terminal device, wherein the paging request message indicates the second network access node should transmit wake-up signalling for the terminal device in accordance with the first wake-up signalling format in advance of transmitting a paging message for the terminal device; and transmit wake-up signalling for the terminal device in accordance with the first wake-up signalling format and subsequently transmit a paging message for the terminal device.

Paragraph 24. Circuitry for a second network access node for use in a wireless telecommunications system comprising a terminal device and a plurality of network access nodes, wherein the circuitry comprises controller circuitry and transceiver circuitry configured to operate together such that the circuitry is operable to: receive from a first network access node an indication of first wake-up signalling configuration information for the first network access node, wherein the first wake-up signalling configuration information comprises an indication of a first wake-up signalling format to be transmitted by the first network access node in advance of transmitting a paging message to indicate the terminal device should seek to decode the paging message, receive from a mobile management entity for the wireless telecommunications system a paging request message for the terminal device, wherein the paging request message indicates the second network access node should transmit wake-up signalling for the terminal device in accordance with the first wake-up signalling format in advance of transmitting a paging message for the terminal device; and transmit wake-up signalling for the terminal device in accordance with the first wake-up signalling format and subsequently transmit a paging message for the terminal device.

REFERENCES

[1] RP-161464, "Revised WID for Further Enhanced MTC for LTE," Ericsson, 3GPP TSG RAN Meeting #73, New Orleans, USA, Sep. 19-22, 2016
[2] RP-161901, "Revised work item proposal: Enhancements of NB-IoT", Huawei, HiSilicon, 3GPP TSG RAN Meeting #73, New Orleans, USA, Sep. 19-22, 2016
[3] RP-170732, "New WID on Even further enhanced MTC for LTE," Ericsson, Qualcomm, 3GPP TSG RAN Meeting #75, Dubrovnik, Croatia, Mar. 6-9, 2017

[4] RP-170852, "New WID on Further NB-IoT enhancements," Huawei, HiSilicon, Neul, 3GPP TSG RAN Meeting #75, Dubrovnik, Croatia, Mar. 6-9, 2017
[5] Holma H. and Toskala A, "LTE for UMTS OFDMA and SC-FDMA based radio access", John Wiley and Sons, 2009
[6] 3GPP TS 36.304 version 14.2.0 Release 14
[7] 3GPP TS 36.321 version 13.5.0 Release 13
[8] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.

The invention claimed is:

1. A method of operating a terminal device in a wireless telecommunications system comprising the terminal device and a plurality of network access nodes, wherein the method comprises:
   receiving first wake-up signal configuration information for a first network access node of the plurality of access nodes, the first wake-up signal configuration information for the first network access node including an indication of an associated first wake-up signal validity period for a first wake-up signal, wherein the first wake-up signal is transmittable by the first network access node in advance of transmitting a first paging message to indicate the terminal device should seek to decode the first paging message;
   monitoring for signalling transmitted by one of the plurality of network access nodes in accordance with the first wake-up signal configuration information during the associated first wake-up signal validity period, and seeking to decode a first subsequent paging message under a first condition where the first wake-up signal in accordance with the first wake-up signal configuration information is detected;
   under a second condition where the first wake-up signal has been transmitted but not detected by the terminal device, and afterward determining that the associated first wake-up signal validity period has expired, monitoring for subsequent paging messages;
   in response to determining that the associated first wake-up signal validity period has expired, receiving second wake-up signal configuration information for a second network access node, the second wake-up signal configuration information including a second indication of an associated second wake-up signal validity period for a second wake-up signal; and
   monitoring for signalling transmitted by said one of the plurality of network access nodes in accordance with the second wake-up signal configuration information during the associated second wake-up signal validity period, and seeking to decode a second subsequent paging message under a second condition where the second wake-up signal in accordance with the second wake-up signal configuration information is detected.

2. The method of claim 1, wherein the terminal device establishes the first wake-up signal configuration information from system information broadcast (SIB) signalling transmitted by the first network access node.

3. The method of claim 1, wherein the terminal device establishes the first wake-up signal configuration information from radio resource control (RRC) signalling transmitted by the first network access node.

4. The method of claim 1, wherein a duration of the associated first wake-up signal validity period is derived from an estimated mobility for the terminal device and/or a context awareness for the terminal device.

5. The method of claim 1, wherein the first network access node still covers a location for the terminal device when the associated first wake-up signal validity period has expired so that the first and second network access nodes are the same network access node.

6. The method of claim 1, wherein the terminal device moves during the associated first wake-up signal validity period such that the first network access node no longer covers a location for the terminal device when the associated first wake-up signal validity period has expired so that the first and second network access nodes are different network access nodes.

7. A mobile terminal device for use in a wireless telecommunications system comprising the mobile terminal device and a plurality of network access nodes, wherein the mobile terminal device comprises controller circuitry and transceiver circuitry configured to operate together such that the mobile terminal device is operable to
   receive first wake-up signal configuration information for a first network access node of the plurality of access nodes, the first wake-up signal configuration information for the first network access node including an indication of an associated first wake-up signal validity period for a first wake-up signal, wherein the first wake-up signal is transmittable by the first network access node in advance of transmitting a first paging message to indicate the terminal device should seek to decode the first paging message;
   monitoring for signalling transmitted by one of the plurality of network access nodes in accordance with the first wake-up signal configuration information during the associated first wake-up signal validity period, and seeking to decode a first subsequent paging message under a first condition where the first wake-up signal in accordance with the first wake-up signal configuration information is detected;
   under a second condition where the first wake-up signal has been transmitted but not detected by the terminal device, and afterward determining that the associated first wake-up signal validity period has expired, monitoring for subsequent paging messages;
   in response to determining that the associated first wake-up signal validity period has expired, receive second wake-up signal configuration information for a second network access node, the second wake-up signal configuration information including a second indication of an associated second wake-up signal validity period for a second wake-up signal; and
   monitor for signalling transmitted by said one of the plurality of network access nodes in accordance with the second wake-up signal configuration information during the associated second wake-up signal validity period, and seeking to decode a second subsequent paging message under a second condition where the second wake-up signal in accordance with the second wake-up signal configuration information is detected.

8. The mobile terminal device of claim 7, wherein the terminal device establishes the first wake-up signal configuration information from system information broadcast (SIB) signalling transmitted by the first network access node.

9. The mobile terminal device of claim 7, wherein the terminal device establishes the first wake-up signal configuration information from radio resource control (RRC) signalling transmitted by the first network access node.

10. The mobile terminal device of claim 7, wherein a duration of the associated first wake-up signal validity period is derived from an estimated mobility for the terminal device and/or a context awareness for the terminal device.

11. The mobile terminal device of claim 7, wherein the first network access node still covers a location for the terminal device when the associated first wake-up signal validity period has expired so that the first and second network access nodes are the same network access node.

12. The mobile terminal device of claim 7, wherein the terminal device moves during the associated first wake-up signal validity period such that the first network access node no longer covers a location for the terminal device when the associated first wake-up signal validity period has expired so that the first and second network access nodes are different network access nodes.

13. The mobile terminal device of claim 7, wherein the second condition further includes the terminal device moving to outside coverage of the first network access node.

14. A method of operating a first network access node in a wireless telecommunications system comprising a terminal device and a plurality of network access nodes, including the first network access node, wherein the method comprises:
    establishing an indication of an estimated mobility for the terminal device, a first wake-up signal validity period for a first wake-up signal being determined from the indication of the estimated mobility for the terminal device; and
    conveying, using the circuitry of the first network access node, an indication of first wake-up signal configuration information to a second network access node, of the plurality of network access nodes, operating in the wireless telecommunications system;
    transmitting, using circuitry of the first network access node, the first wake-up signal configuration information for the first network access node of the plurality of access nodes, the first wake-up signal configuration information for the first network access node including an indication of the first wake-up signal validity period for the first wake-up signal; and
    transmitting, using the circuitry of the first network access node, the first wake-up signal in advance of transmitting a first paging message to indicate the terminal device should seek to decode the first paging message.

15. The method of claim 14, further comprising transmitting, using the circuitry of the first network access node, signalling in accordance with the first wake-up signal configuration information during the associated first wake-up signal validity period.

16. The method of claim 14, further comprising transmitting, using the circuitry of the first network access node, system information broadcast (SIB) signalling to the terminal device to establish the first wake-up signal configuration information.

17. The method of claim 14, further comprising transmitting, using the circuitry of the first network access node, radio resource control (RRC) signalling to the terminal device to establish the first wake-up signal configuration information.

* * * * *